United States Patent Office 3,196,078
Patented July 20, 1965

3,196,078
PROCESS FOR COMBATING RETINITIS
PIGMENTOSA
Albert B. Chatzinoff, Fresh Meadows, N.Y., and William Oroshnik, Plainfield, N.J., assignors to Ortho Pharmaceutical Corporation, a corporation of New Jersey
No Drawing. Filed Jan. 30, 1962, Ser. No. 169,938
2 Claims. (Cl. 167—81)

The present application is a continuation-in-part of our co-pending application Ser. No. 664,923, filed June 11, 1957, now abandoned.

The present invention relates to composition useful in the disease retinitis pigmentosa. More particularly, this invention relates to such compositions in which the active ingredient is the 11-cis isomer of vitamin A having the structural formula

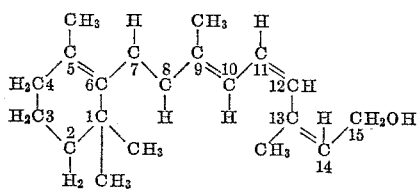

or an ester o fthis isomer.

Retinitis pigmentosa is a degenerative disease of the eye which appears in certain individuals who may have a genetic predisposition to it. It manifests itself in the gradual deterioration of the photosensitive cells in the eye with an accompainying deposition of pigment. The course of the disease may take place over a period of 10 to 20 years but in all cases severe impairment of vision results. Prior to the present invention, no therapy was known for it. We have now discovered that if the 11-cis isomer of vitamin A is administered orally, by injunction, or rectally, the progress of the disease may be halted. The role of vitamin A and its aldehyde, retinene, in vision has been very thoroughly explored. Our knowledge of this process may be summarized as follows:

Vitamin A from the blood stream enters the retina. There it is oxidized by an enzyme system to retinene, and stereoisomerized to neoretinene-b. In the absence of light, the neoretinene-b is continuously removed by combination with the protein opsin. The compound formed between neoretinene-b and opsin is called rhodopsin. On contact with light, the rhodopsin is immediately broken down to retinene and opsin, or in other words, is bleached. The released retinene reenters the equilibrium with vitamin A and any excess of the latter that may occur as a consquence then goes back to the blood stream.

While the present invention is not to be limited to any particular theory of operation it seems likely that retinitis pigmentosa may be caused by the inability of the individual to convert the naturally occurring all-trans retinene into the 11-cis isomer (neoretinene-b) in sufficient quantities for the maintenance of a healthy metabolic condition in the eye. Our evidence indicates that 11-cis vitamin A may be oxidized to 11-cis retinene (neoretinene-b) in the eye and that a continuous supply of 11-cis vitamin A to the eye can effectively correct the inability of the eye to convert retinene to neoretine-b. Thus subminimal doses of the 11-cis isomer of vitamin A will maintain a healthy eye condition. On the other hand, retinal degeneration occurs when an equal (subminimal) amount of normal vitamin A is administered orally.

Among the objects of the present invention is the production of compositions for combating retinitis pigmentosa in humans. Another object of this invention is to permit the retinal cells to function at their optimum capacity and decrease the dark adaption time.

This invention embraces the use of the 11-cis isomer of vitamin A in various forms, e.g., as such, or in the form of its esters of which the acetate and palmitate are illustrative.

It has been found that the aforesaid 11-cis isomer has unexpected and unobvious properties of great value in combating retinitis pigmentosa. Insofar as is known, the physiological properties of this isomer have not heretofore been investigated; nor has the compound been applied for therapeutic purposes.

Not only is the compound effective on administration by the oral route, but it is also effective when administered parenterally, e.g., subcutaneously or intraperitoneally. The tolerated dose orally in humans is from 100 to 100,000 units. One milligram of the 11-cis isomer of vitamin A is equivalent to approximately 375 units according to the U.S.P. growth method of assay. (See U.S.P. XIV, pages 789–792.)

The percentage of active ingredient in the compositions of the present invention may be varied. It is necessary that the 11-cis isomer of vitamin A or its ester constitute a proportion such that a suitable dosage will be obtained. Obviously several unit dosage forms may be administered at or about the same time. It is preferred to use not less than 1% by weight of the active isomer since activity decreases with concentration of the agent. The concentration of the isomer may be 10% or 25% or even a greater proportion. For example, in preparing tablets the following ranges are particularly useful:

Adsorbent _____ percent__ 1–60
Filler _____ do____ 40–90
Lubricant _____ do____ 0.5–10
11-cis isomer _____ units__ 100–100,000

In making tablets the vitamin A isomer must be adsorbed onto an inert adsorbent such as kaolin, Fuller's earth, magnesium oxide, calcium carbonate, starch, etc.

The fillers are those generally used in the manufacture of tablets such as lactose, dextrose, sucrose or mixtures of sugars.

Lubricating agents prevent sticking and binding of the powder mass in the dies and on the punches of the tableting machine. Those generally used are magnesium stearate, talc, calcium stearate, mineral oil, etc.

Compressed or sugar-coated tablets disintegrate in the stomach. If it is desirable to circumvent the stomach and have the active ingredient released in the intestines, the compressed tablets may be enteric coated with shellac, salol, cellulose acetate phthalate, mastic, etc.

The following examples will illustrate specific formulae that may be varied or modified to a considerable extent without departing from the spirit of the invention. The invention should not, therefore, be limited to the specific embodiments set forth in these examples.

*Example I*

(1) Calcium carbonate _____ gm__ 0.01
(2) 11-cis isomer _____ units__ 100
(3) Lactose, q.s. _____ gm__ 0.50
(4) Magnesium stearate _____ gm__ 0.01

Adsorb 2 on 1, add 3 and granulate according to the art with starch paste. Dry, add 4, mix and compress into tablets. These tablets may be left uncoated, coated with sugar or enteric coated according to the art. Enteric coated tablets usually have a sugar coating over the enteric coating.

Example II (1) Kaolin _____ gm__ 0.200
(2) 11-cis isomer _____ units__ 50,000
(3) Lactose, q.s. _____ gm__ 0.500
(4) Sucrose _____ gm__ 0.100
(5) Calcium stearate _____ gm__ 0.02

Adsorb 2 on 1, add 3 and 4 and granulate according to the art with gelatin solution. Dry, add 5, mix and compress into tablets. These tablets may be left uncoated, sugar coated, or enteric coated.

Example III

The 11-cis isomer of vitamin A may be admixed with vitamin A in proportions of 1:100 to 100:1.

(1) Fuller's earth _____ gm__ 0.150
(2) 11-cis isomer _____ units__ 50,000
(3) Vitamin A _____ do____ 2,000
(4) Lactose, q.s. _____ gm__ 0.500
(5) Talc _____ gm__ 0.05

Adsorb 2 and 3 on 1, add 4 and granulate with starch paste. Dry, add 5, mix and compress into tablets. These tablets may be left uncoated, sugar coated or enteric coated.

Example IV (1) Starch _____ gm__ 0.20
(2) 11-cis isomer _____ units__ 5,000
(3) Vitamin A _____ do____ 25,000
(4) Lactose, q.s. _____ gm__ 0.50
(5) Sucrose _____ gm__ 0.10
(6) Magnesium stearate _____ gm__ 0.01

Adsorb 2 and 3 on 1, add 4 and 5 and granulate with acacia solution. Dry, add 5, mix and compress into tablets. These tablets may be enteric coated, sugar coated or left uncoated.

Example V

Hard gelatin capsule formulations differ from tablet formulations in that fillers are often not required and the powder mass need not be granulated. A decided advantage of this dosage form is that more adsorbent may be used for liquid active ingredients.

Hard gelatin capsules may be enteric coated according to the art using the same enteric coating materials as for tablets.

(1) Kaolin _____ gm__ 0.30
(2) 11-cis isomer _____ units__ 50,000
(3) Magnesium stearate _____ gm__ 0.01

Adsorb 2 on 1, add 3, mix and fill into capsules. These may or may not be enteric coated.

Example VI (1) Calcium carbonate _____ gm__ 0.20
(2) 11-cis isomer _____ units__ 1,000
(3) Calcium stearate _____ gm__ 0.10

Adsorb 2 on 1, add 3, mix and fill into capsules. These capsules may be enteric coated according to the art.

Example VII (1) Fuller's earth _____ gm__ 0.25
(2) 11-cis isomer _____ units__ 25,000
(3) Vitamin A _____ do____ 10,000
(4) Talc _____ gm__ 0.02

Adsorb 2 and 3 on 1, add 4, mix and fill into capsules.

Example VIII

Concentrations of 100 to 100,000 units of 11-cis isomer may be incorporated into standard vitamin preparations such as "U.S.P. Decavitamin Capsules."

Soft gelatin capsules are used as dosage forms for oily liquids. If an active ingredient is oil soluble, this becomes a very desirable form to dispense individual doses. These capsules are more convenient than measuring a dose of oil solution by drop, cc. or teaspoonful. Anti-oxidants are generally included in these oil solutions to prevent the oxidation of the active ingredients during the shelf-life of the product. Anti-oxidants such as alpha-tocopherol, alpha-tocopherol acetate, nordihydroguaiaretic acid, ionol, etc., may be used.

Soft gelatin capsules may be enteric coated according to the art using the enteric coating materials shown for tablets.

(1) Corn oil _____ cc__ 0.200
(2) Tocopherol _____ gm__ 0.001
(3) 11-cis isomer _____ units__ 15,000

Dissolve 2 and 3 in 1, mix and fill into soft gelatin capsules. Enteric coat if desired.

Example IX (1) Sesame oil _____ cc__ 0.250
(2) Nordihydroguaiaretic acid _____ gm__ 0.001
(3) 11-cis isomer _____ units__ 20,000

Formulate as in Example VIII above.

Example X (1) Peanut oil _____ cc__ 0.400
(2) Ionol _____ gm__ 0.001
(3) 11-cis isomer _____ units__ 500
(4) Vitamin A _____ do____ 25,000

Dissolve 2, 3, and 4 in 1, mix and fill into soft gelatin capsules. Enteric coat if desired.

Example XI 11-cis isomer in concentrations of 100 to 100,000 units may be included in multivitamin preparations containing a mixture of vitamins such as are in U.S.P. Decavitamin Tablets and incorporated in oil and filled into soft gelatin capsules. These capsules may be enteric coated if desired.

The 11-cis isomer of vitamin A and its esters may also be added to liquid vitamin A preparations such as Oleum Percomorphum (a liquid vitamin A product sold by the Mead Johnson Co.).

It is well known that substances are absorbed from the rectum, so that rectal suppositories often provide a desirable form of therapeutic vehicle.

The 11-cis isomer may be incorporated into such preparations in concentrations of 100 to 100,000 units—with or without vitamin A or other vitamins.

(1) Cocoa butter, q.s. _____ gm__ 2
(2) 11-cis isomer _____ units__ 40,000

Dissolve 2 in 1 and mold into suppositories.

Example XII (1) Polyethylene glycol, 400 _____ gm__ 0.50
(2) Polyethylene glycol, 5000 _____ gm__ 1.50
(3) 11-cis isomer _____ units__ 30,000

Dissolve 3 in 1 and 2 and mold into suppositories.

Example XIII (1) Cocoa butter, q.s. _____ gm__ 2.0
(2) Beeswax _____ gm__ 0.01
(3) 11-cis isomer _____ units__ 100
(4) Vitamin A _____ do____ 10,000

Dissolve 2 in 1, add 3 and 4, mix and mold into suppositories.

Oils, oily solutions and aqueous dispersions can be administered by intramuscular and subcutaneous injection. The speed of absorption of these injections may be modified by the addition of procaine, etc.

Example XIV (1) Sesame oil q.s. _____ cc__ 1.0
(2) α-Tocopherol _____ gm__ 0.001
(3) 11-cis isomer _____ units__ 50,000

Dissolve 2 and 3 in 1, and fill into ampules.

Example XV (1) Tween 80 ----------------------- gm -- 0.01
(2) 11-cis isomer ------------------- units -- 20,000
(3) Ascorbic acid ------------------- gm -- 0.01
(4) Water for injection, q.s. ------- cc -- 1.0

Dissolve 2 in 1 and 3 in 4. Mix and fill into ampules.

The following examples illustrate formulations that may be injected intravenously.

Example XVI (1) Lecithin, highly purified ------- gm -- 0.05
(2) 11-cis isomer ------------------- units -- 10,000
(3) Sodium ascorbate ---------------- gm -- 0.001
(4) Water for injection, q.s. ------- cc -- 1.0

Dissolve 2 in 1 and 3 in 4, and fill into ampules.

Example XVII (1) Sucrose monostearate ------------ gm -- 0.05
(2) 11-cis isomer ------------------- units -- 5,000
(3) α-Tocopherol acetate ------------ gm -- 0.001
(4) Water for injection, q.s. ------- cc -- 1.0

Dissolve 2 in 1, add 3 and 4, mix and fill into ampules.

What is claimed is:

1. A method of combating retinitis pigmentosa which comprises administering to a human being from 100 units to 100,000 units of the 11-cis isomer of vitamin A.

2. A method of combating retinitis pigmentosa which comprises administering to a human being from 100 units to 100,000 units of a saturated organic acid ester of the 11-cis isomer of vitamin A.

References Cited by the Examiner

Physicians' Desk Reference, 1956, tenth edition, published by Medical Economics Inc., Oradell, N.J., 1955, pages 291–292.

Remington's Practice of Pharmacy, published by the Merck Publishing Co., Easton, Pa., 1956, page 377.

Wald et al., Federation of American Societies for Experimental Biology, Proceedings, vol. 14, Mar. 1955, page 300.

JULIAN S. LEVITT, *Primary Examiner.*

MORRIS O. WOLK, FRANK CACCIAPAGLIA, JR., LEWIS GOTTS, *Examiners.*